(12) United States Patent
Kapoulyansky et al.

(10) Patent No.: US 10,296,402 B2
(45) Date of Patent: May 21, 2019

(54) SCHEDULING JOBS

(71) Applicant: Hewlett Packard Enterprise Development LP, Houston, TX (US)

(72) Inventors: Peter Kapoulyansky, Yehud (IL); Mark Bramnik, Yehud (IL); Adi Kopelevich, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 50 days.

(21) Appl. No.: 14/972,639

(22) Filed: Dec. 17, 2015

(65) Prior Publication Data
US 2017/0177402 A1 Jun. 22, 2017

(51) Int. Cl.
G06F 9/50 (2006.01)
G06F 9/54 (2006.01)

(52) U.S. Cl.
CPC ............ G06F 9/546 (2013.01); G06F 9/5027 (2013.01)

(58) Field of Classification Search
CPC ....................................................... G06F 9/46
See application file for complete search history.

(56) References Cited

U.S. PATENT DOCUMENTS

| | | | |
|---|---|---|---|
| 7,526,561 B2 | 4/2009 | Bloch et al. | |
| 8,627,321 B2 | 1/2014 | Teichmann et al. | |
| 8,732,160 B2 | 5/2014 | Olston | |
| 2008/0320482 A1* | 12/2008 | Dawson | G06F 9/5027 718/104 |
| 2009/0288090 A1* | 11/2009 | Ujibashi | G06F 9/5011 718/103 |
| 2010/0305912 A1 | 12/2010 | Viassolo et al. | |
| 2012/0047509 A1* | 2/2012 | Ben-Itzhak | G06F 9/4881 718/103 |
| 2012/0266182 A1* | 10/2012 | Brazier | G06F 9/4881 718/106 |
| 2013/0111488 A1* | 5/2013 | Gatti | G06Q 10/06 718/103 |
| 2013/0283097 A1* | 10/2013 | Chen | G06F 9/5027 714/16 |
| 2013/0297907 A1 | 11/2013 | Ki et al. | |
| 2014/0067778 A1 | 3/2014 | Borthakur et al. | |
| 2015/0026699 A1* | 1/2015 | Nakamura | G06F 11/3003 718/106 |

(Continued)

OTHER PUBLICATIONS

Rhoden, B., "Operating System Support for Parallel Processes", Electrical Engineering and Computer Sciences University of California at Berkeley, Technical Report No. UCB/EECS-2014-223, Dec. 18, 2014.

*Primary Examiner* — Charlie Sun

(57) ABSTRACT

In example implementations, an apparatus is provided. The apparatus includes a memory that includes instructions and a processor coupled to the memory to execute the instructions. The instructions include instructions to receive a plurality of job requests from a scheduler service computing system that is separate from the apparatus, wherein the plurality of job requests is from a multiple tenants, generate a schedule and a message in accordance with a definition associated with each one of the plurality of job requests and send the message to a messaging queue that is to distribute the message to a job executor computing system that is separate from the apparatus to execute at least one of the plurality of job requests in accordance with a schedule.

7 Claims, 4 Drawing Sheets

(56) References Cited

U.S. PATENT DOCUMENTS

2015/0074451 A1  3/2015 Yoshida et al.
2015/0347189 A1* 12/2015 Steffen ................. G06F 9/4893
                                                    718/103
2016/0170811 A1*  6/2016 Peacock .................... G06F 9/52
                                                    718/106

* cited by examiner

SCHEDULING JOBS

BACKGROUND

A job scheduler may be a computer application used to control unattended background program execution within the same computing system. The job scheduler may receive defined background jobs, prioritize the background jobs, monitor the execution of the background jobs, and the like, within the same computing system.

DETAILED DESCRIPTION

The present disclosure provides examples of a scalable architecture for job schedulers. A job scheduler may be part of a single computing system that includes the interfaces and job executors on the same computing system. As a result, in modern multi-tenant applications, the number of background jobs may correlate with the growing number of tenants. This configuration of job schedulers may provide either too much capability, or too little capability, to execute background jobs. As a result, if the job scheduler system lacks sufficient capacity, then an entire new job scheduler system may be deployed.

The present disclosure provides an architecture that separates the job scheduling architecture into three distinct layers. For example, scheduler services may be deployed on a first computing system, the scheduler runner may be deployed on a second computing system, and job executors may be deployed on a third computing system.

As a result, if the job scheduling system reaches full capacity, the architecture of the present disclosure allows, in some examples, additional job executor computing systems to be added to an existing job scheduling system. In some examples, if there are not enough scheduler service computing systems, then additional scheduler service computing systems can be added to the existing job scheduling system.

Furthermore, if one portion of the job scheduling system malfunctions, the portion that has malfunctioned may be replaced without replacing the entire job scheduling system, or without taking down the entire job scheduling system for repair. For example, if the scheduler runner malfunctions, then the computing system executing the scheduler runner may be replaced without replacing the other computing systems executing the scheduler services or the job executors.

Figure 1:
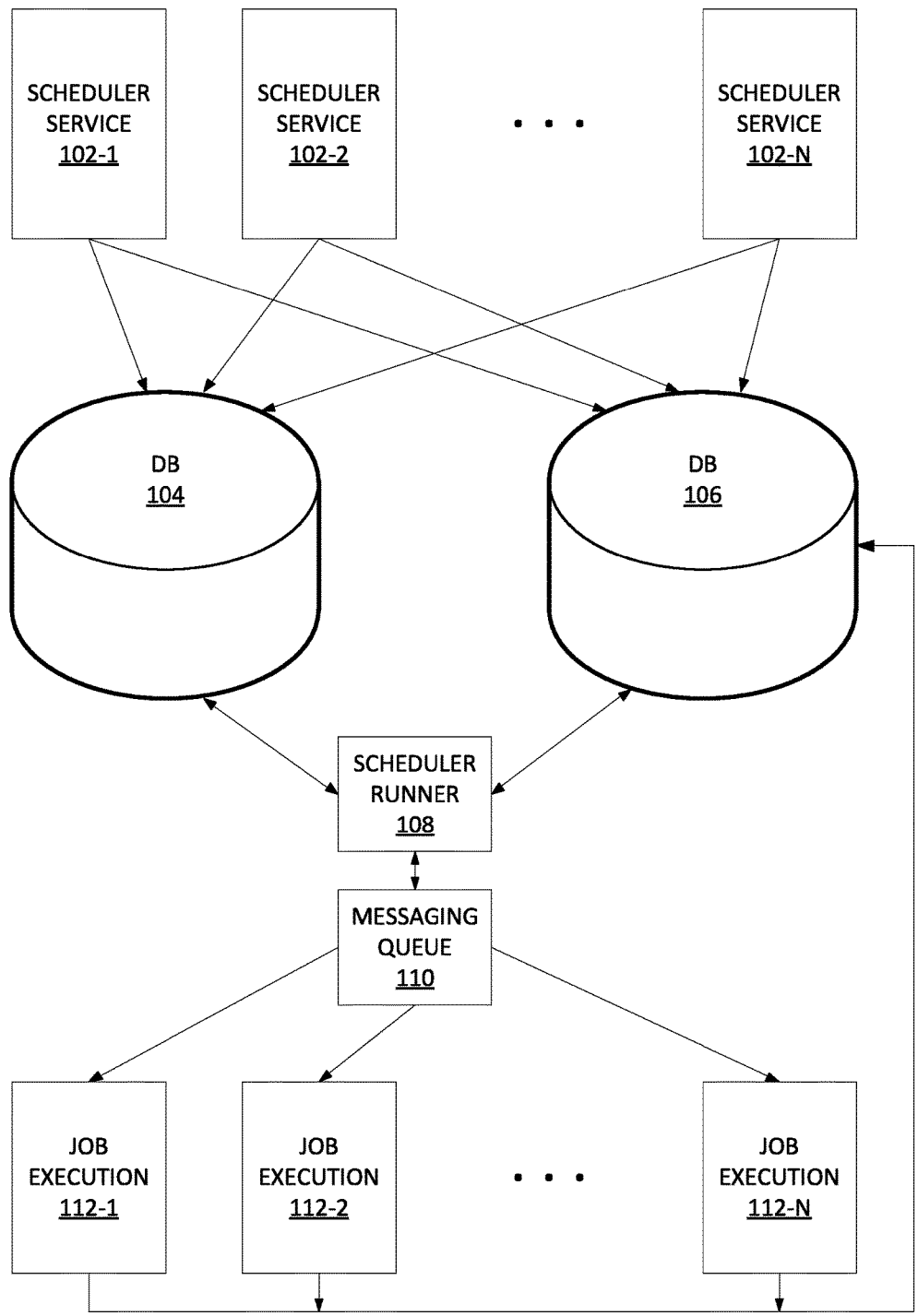
FIG. 1 is a block diagram of an example system of the present disclosure.

FIG. 1 illustrates a block diagram of an example system 100 of the present disclosure. The system 100 illustrates a scalable architecture for a job scheduler that divides the job scheduler into separate independent components.

The system 100 may include a plurality of scheduler service computing systems 102-1 to 102-N (herein referred to individually as a scheduler service computing system 102 or collectively as scheduler service computing systems 102). In one example, the scheduler service computing systems 102 may each be deployed as separate, independent, computing systems that include a respective processor, a respective memory, a respective user interface, and the like. The term "separate" as used herein, may be defined to mean being physical apart from one another. However, devices may be separated but located together within a common housing of a device. For example, a processor may be separate from a memory in a computer system, but located together within the same housing of the computer system.

Each one of the scheduler service computing systems 102 may be associated with a different tenant. A tenant may be a single user or a group of users. For example, the system 100 may support multiple tenants. Each tenant may submit a different type of job request. Thus, the system 100 may also support a plurality of job requests that are different types of job requests or have a different context. A context may provide the system 100 information relating to how metadata related to the job definition should be examined and evaluated. The context may provide information such as, a type of job or a class of the job.

The scheduler service computing systems 102 may provide an interface for each tenant to submit a job request. The job requests may then be sent to a first database 104 and a second database 106. The first database 104 and the second database 106 may be stored in a different physical storage device or database server.

In one example, the first database (DB) 104 may be a job triggering DB that defines how a job is executed, an execution schedule, definitions for execution terms, and the like. One example of a DB that can be used as the first DB 104 may be the Quartz Scheduler®. Quartz Scheduler® is an example of an open source job scheduling library that can be integrated with various Java applications. The Quartz Scheduler® can be used to create schedules for executing jobs.

In one example, the second (DB) 106 may be a DB that stores the job requests and a status of the job requests. For example, the status of the job requests may include whether the job request is being executed, the job request has completed, and the like. The second DB 106 may be a document oriented database such as MongoDB®. The MongoDB® is an example cross-platform document-oriented database. The MongoDB® uses java script object notation (JSON) like documents with dynamic schemas instead of a table-based relational database structure.

The system 100 may also include a scheduler runner computing system 108. The scheduler runner computing system 108 may be deployed as a separate, independent, computing system that includes a respective processor, a respective memory, a respective user interface, and the like, that is different from and remotely located from the scheduler service computing systems 102. The term "remotely," as used herein, may be defined to mean separate from and located away from one another. For example, a first device remotely located from a second device can be interpreted to mean that the first device is at a different location or a different premises than the second device. In other words, the first device and the second device do not share a common housing.

The scheduler runner computing system 108 may generate a schedule for executing the job requests in accordance with how the job requests are defined by the first DB 104. As noted above, each job request may be defined to have a particular execution schedule, complexity associated with the how the job is executed, particular job execution terms, and the like. The scheduler runner computing system 108 may generate the schedule to ensure that the job requests are executed within the parameters of the respective definition of each job request.

In one implementation, the scheduler runner computing system 108 may also generate a plurality of messages that are sent or transmitted to a messaging queue 110. In one example, the messages may include the job request and the schedule. When one of the job executor computing systems 112-1 to 112-N (herein referred to individually as a job executor computing system 112 or collectively as job executor computing systems 112) receives the message, the respective job executor computing system 112 may execute the job request based on the schedule.

The job executor computing systems 112 may also be deployed as a separate, independent, computing system that include a respective processor, a respective memory, a respective user interface, and the like. In other words, the scheduler service computing systems 102, the first DB 104, the second DB 106, the scheduler runner computing system 108, the messaging queue 110 and the job executor computing systems 112 may all be separate computing systems that are independent of one another. As a result, the system 100 may, for example, provide a job scheduler that is easily scalable, handles multiple jobs from different tenants, supports different types of jobs within a tenant context, and provides better and dynamic utilization of resources.

For example, if the system 100 lacks processing resources, or cannot meet the current job request demands, additional job executor computing systems 112 may be added instead of adding entire job scheduler systems. In addition, if the system 100 does not have enough scheduler service computing systems 102 for new tenants, then additional scheduler service computing systems 102 may be added instead of adding entire job scheduler systems. In other words, the system 100 allows a sufficient number of scheduler service computing systems 102 and job executor computing systems 112 to be added dynamically as the demand for additional job request grows.

In one example, messaging queue 110 may allow the scheduler runner 108 to communicate with the remotely located or separate job executor computing systems 112. In one example, the messaging queue 110 may be an advanced message queuing protocol (AMQP) (e.g., RabbitMQ®). For example, the message may have a format associated with AMQP (e.g., a header field, a property field and a data field). The RabbitMQ is an example open source message broker that uses AMQP. The RabbitMQ server is written in an Erlang programming language that is built on the Open Telecom Platform framework for clustering and failover.

The messages may include the schedule and the job request definitions and be directed to a particular job executor computing system 112. In one implementation, each job executor computing system 112 may be associated with a respective messaging queue 110. The scheduler runner computing system 108 may send a respective message for a job request to the messaging queue 110 assigned to a particular job executor computing system 112 to execute the job request.

In one implementation, the job executor computing systems 112 may have different processing capabilities. For example, the computing system 112-1 may have more powerful processors and more memories than the computing system 112-2. In another example, the computing system 112-1 may have parallel processing capability to execute multiple jobs in parallel, whereas the computing system 112-2 may have a single core processor and execute one job at a time in a serial fashion.

In addition, some job executor computing systems 112 may be offline and other job executor computing systems 112 may be online. For example, the job executor computing systems 112 that are offline may be used to execute background job requests, while the job executor computing systems 112 that are online may be used to execute job requests immediately, or as a user of a tenant is watching. Thus, based on the different processing capabilities, whether the job executor computing system 112 is online or offline and the definitions associated with the job request, the scheduler runner computing system 108 may generate a message for a particular job executor computing system 112.

In one example, the job executor computing systems 112 may be in communication with the second DB 106. For example, the job executor computing systems 112 may provide an update for the status of each job request to the second DB 106. The status of each job request may then be kept up to date in the second DB 106.

Figure 2:
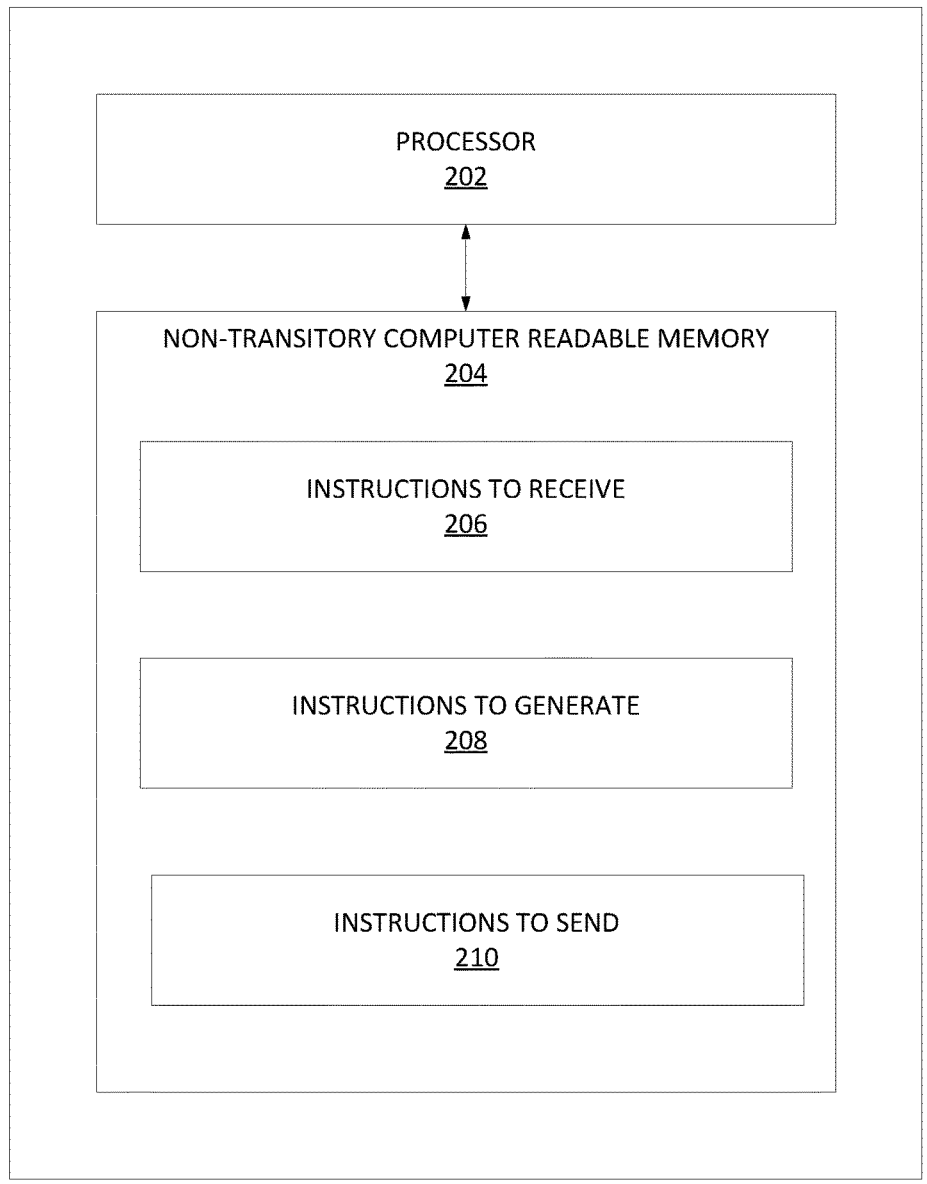
FIG. 2 is a block diagram an example scheduler runner of the present disclosure.

FIG. 2 illustrates a block diagram of an example of the scheduler runner computing system 108. In one example, the scheduler runner computing system 108 may include a processor 202 and a non-transitory computer readable storage medium 204. The non-transitory computer readable storage medium 204 may include instructions 206, 208 and 210 that can be executed by the processor 202.

In one example, the instructions 206 may include instructions to receive a plurality of job requests from a scheduler service computing system that is separate from the apparatus, wherein the plurality of job requests are from multiple tenants. For example, the scheduler runner computing system 108 may include a first communication interface to establish a communication path between the scheduler runner computing system 108 and the scheduler service computing systems 102. The plurality of job requests may be received via the first communication interface either directly, or indirectly. For example, a job request may first be defined via the first DB 104 and received from the first DB 104 over the first communication interface.

The instructions 208 may be instructions to generate a schedule and a message in accordance with a definition associated with each one of the plurality of job requests. As discussed above, the job requests may be defined by the first DB 104 with a variety of different parameters such as how the job is executed, an execution scheduler, definitions of execution terms, and the like. The instructions 208 may take into consideration the definitions associated with each job request and the available job executor computing systems 112 to generate a schedule to execute the job requests and a message for each job request directed towards a particular job executor computing system 112.

The instructions 210 may be instructions to send the message to a messaging queue that is to distribute the message to a job executor computing system that is separate from the apparatus to execute at least one of the plurality of job requests in accordance with a schedule. For example, the scheduler runner computing system 108 may include a second communication interface to establish a communication path between the scheduler runner computing system 108 and the messaging queue 110. The messaging queue 110 may then forward the message to a job executor computing system via another communication path between the messaging queue 110 and the job executor computing system. The message may contain the schedule and the job request and be used by the job executors to execute the job request.

Figure 3:
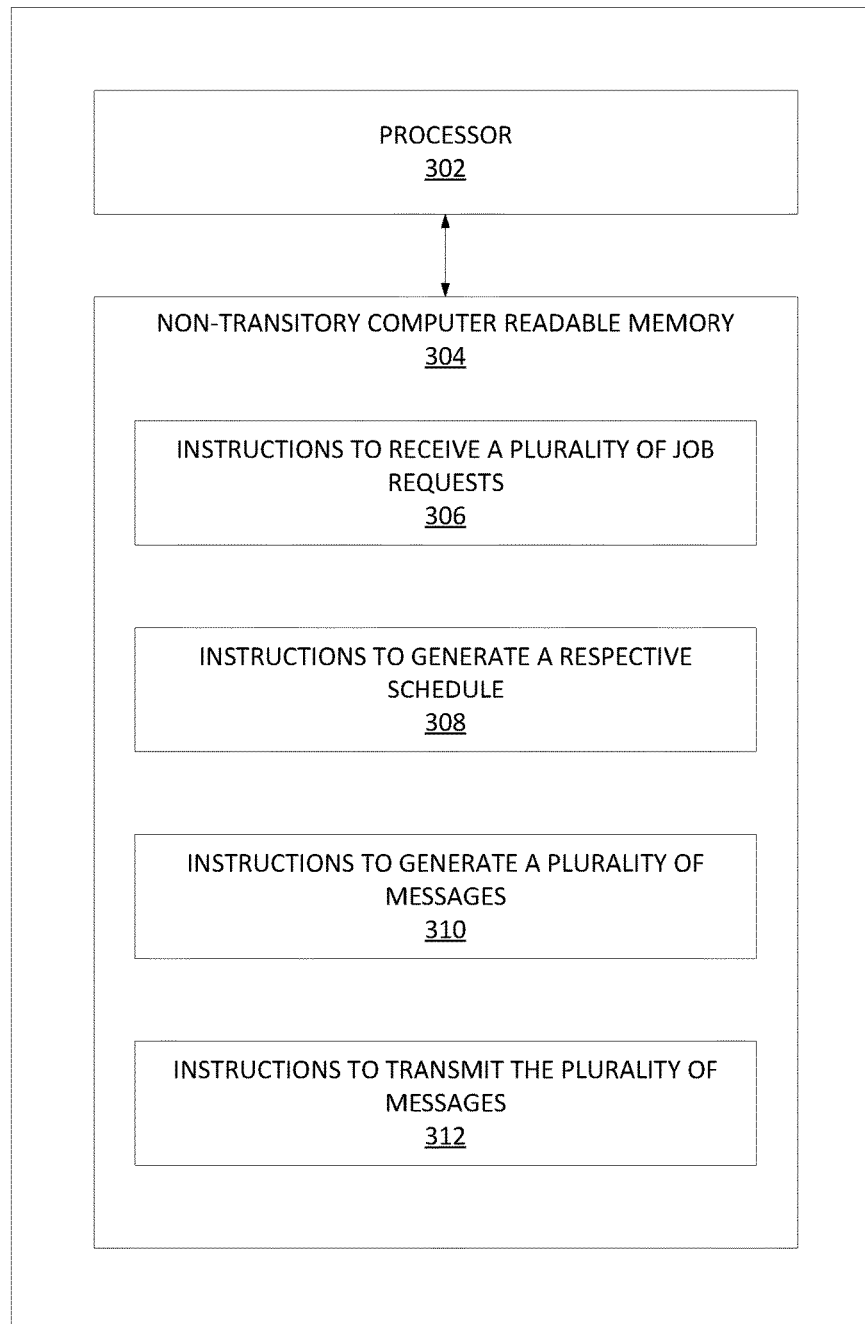
FIG. 3 is a block diagram of an example apparatus of the present disclosure.

FIG. 3 illustrates an example of an apparatus 300. In one example, the apparatus 300 may also be the scheduler runner 108. In one example, the apparatus 300 may include a processor 302 and a non-transitory computer readable storage medium 304. The non-transitory computer readable storage medium 304 may include instructions 306, 308, 310 and 312 that can be executed by the processor 302.

In one example, the instructions 306 may include instructions to receive a plurality of job requests. The plurality of job requests may be from a plurality of first computing systems. For example, the first computing systems may be the scheduler service computing systems 102. In addition, different computing systems of the plurality of first computing systems may be associated with different tenants and different job types.

The instructions 308 may include instructions to generate a schedule. For example, the schedule may be for how and when each one of the plurality of job requests should be executed based on a job request definition associated with each one of the plurality of job requests. In one example, the job requests may be defined by a first DB 104.

The instructions 310 may include instructions to generate a plurality of messages. For example, the plurality of messages may include the schedule and a respective job request of the plurality of job requests. In one implementation, the messages may be messages associated with AMQP.

The instructions 312 may include instructions to transmit the plurality of messages. For example, the plurality of messages may be transmitted to a messaging queue such that the job requests can be forwarded to one of a plurality of second computing systems. In other words, the messaging queue may transmit a respective message of the plurality of messages to at least one of the plurality of second computing systems in accordance with the schedule to execute the respective job request of the plurality of job requests. In one implementation, the plurality of second computing systems may be the job executor computing systems 112.

Figure 4:
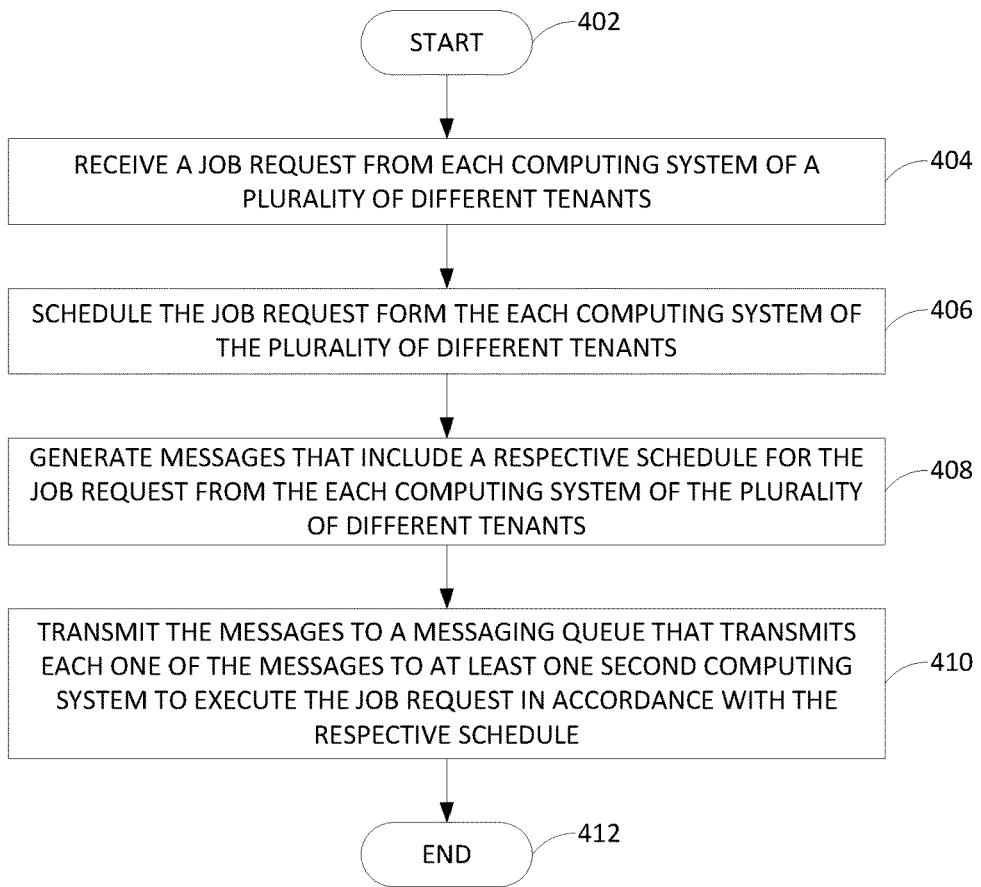
FIG. 4 is a flow diagram of an example method for scheduling jobs.

FIG. 4 illustrates a flow diagram of an example method 400 for scheduling background jobs. In one example, the blocks of the method 400 may be performed by the scheduler runner 108, or the apparatus 300.

At block 402, the method 400 begins. At block 404, the method 400 receives a job request from a first computing system. In one example, the first computing system may be a scheduler service computing system that provides an interface for users of a tenant to submit job requests. In one implementation, a plurality of job requests may be received from a plurality of different scheduler service computing systems that are associated with different tenants. In other words, method 400 may be applicable for a multiple tenant system. In addition, each one of the plurality of job requests may be a different type of job.

At block 406, the method 400 schedules the job request. In one example, the job request may be scheduled based upon definitions associated with the job request. For example, a first database (e.g., a Quartz Scheduler®) may be used to define the job request. Defining the job request may include defining how the job is executed, an execution schedule, definitions for execution terms, and the like.

At block 408, the method 400 generates a message that includes a schedule for the job request. As discussed above, the architecture of the present disclosure provides a scalable architecture for a job scheduler system. The architecture separates each function of the job scheduler system as separate independent computing systems. The message may be in an AMQP format and used to transmit the job request and the schedule to remotely located computing systems (e.g., job executor computing systems) that execute the jobs. The messages may, in some examples, provide a way for the scheduler runner to communicate the job requests to the remotely located computing systems since they may not be part of the same computing system configured as part of the same network.

At block 410, the method 400 transmits the message to a messaging queue that transmits the message to a second computing system to execute the job request in accordance with the schedule. In one implementation, the second computing system may be the job executor computing systems. In one example, a plurality of second computing systems may be deployed such that each will have a different processing capability. As a result, some job requests may be directed to a particular one of the second computing systems based on the definitions associated with the job request.

In one implementation, the messaging queue may forward the message to the second computing system. In other examples, the second computing system may pull or pop the next message out of the messaging queue. In one example that uses a plurality of second computing systems, a plurality of messaging queues may be deployed, where each one of the plurality of second computing systems is associated with one of the plurality of messaging queues.

In one implementation, the second computing system may be in communication with a second DB that stores each job request that is submitted and provides a status of each job request. For example, the second computing system may provide the second DB a status update that a particular job request is in process, completed, not yet received, and the like. At block 412, the method 400 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
a memory comprising instructions;
a processor coupled to the memory, the processor to execute the instructions to:
receive a plurality of job requests from a scheduler service computing system that is separate from the apparatus, wherein the plurality of job requests is from multiple tenants;
generate a schedule and a message in accordance with a definition associated with each one of the plurality of job requests, wherein generation of the schedule and the message for a given job request of the plurality of job requests is based on context data associated with the given job request, and the context data describes how metadata related to the associated job definition should be evaluated; and
send the message to a messaging queue that is to distribute the message to a job executor computing system that is separate from the apparatus to execute at least one of the plurality of job requests in accordance with the schedule.

2. The apparatus of claim 1, wherein the plurality of job requests is to be defined by a first database that is to communicate with the apparatus.

3. The apparatus of claim 1, wherein the plurality of job requests and a respective status of the each one of the plurality of job requests are stored in a second database that is to communicate with the apparatus.

4. The apparatus of claim 1, wherein the job executor computing system comprises a plurality of job executor computing systems that are remotely located from the apparatus, wherein the plurality of job executor computing systems each comprises a different processing capability.

5. The apparatus of claim 4, wherein the messaging queue is to send a respective message to at least one of the plurality of job executor computing systems in accordance with the schedule.

6. The apparatus of claim 1, wherein the given job request is associated with a first tenant of the multiple tenants, a second job request of the plurality of job requests is associated with a second tenant of the multiple tenants, and the second job request is associated with second context data describing how the job definition associated with the second job request should be evaluated.

7. The apparatus of claim 1, wherein the context data associated with the given job request represents a first context that is different from a second context associated with the second context data.

* * * * *